UNITED STATES PATENT OFFICE.

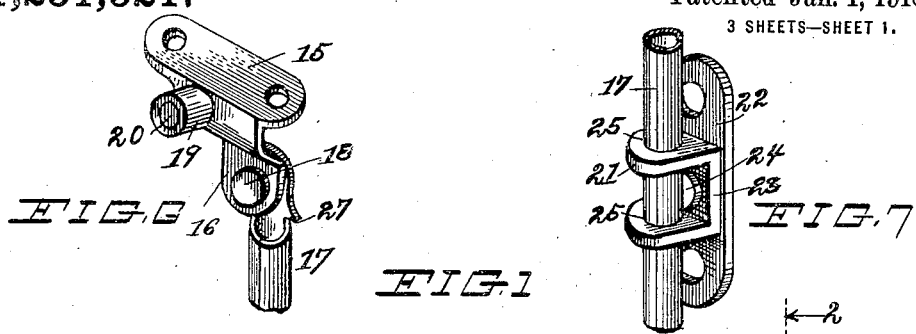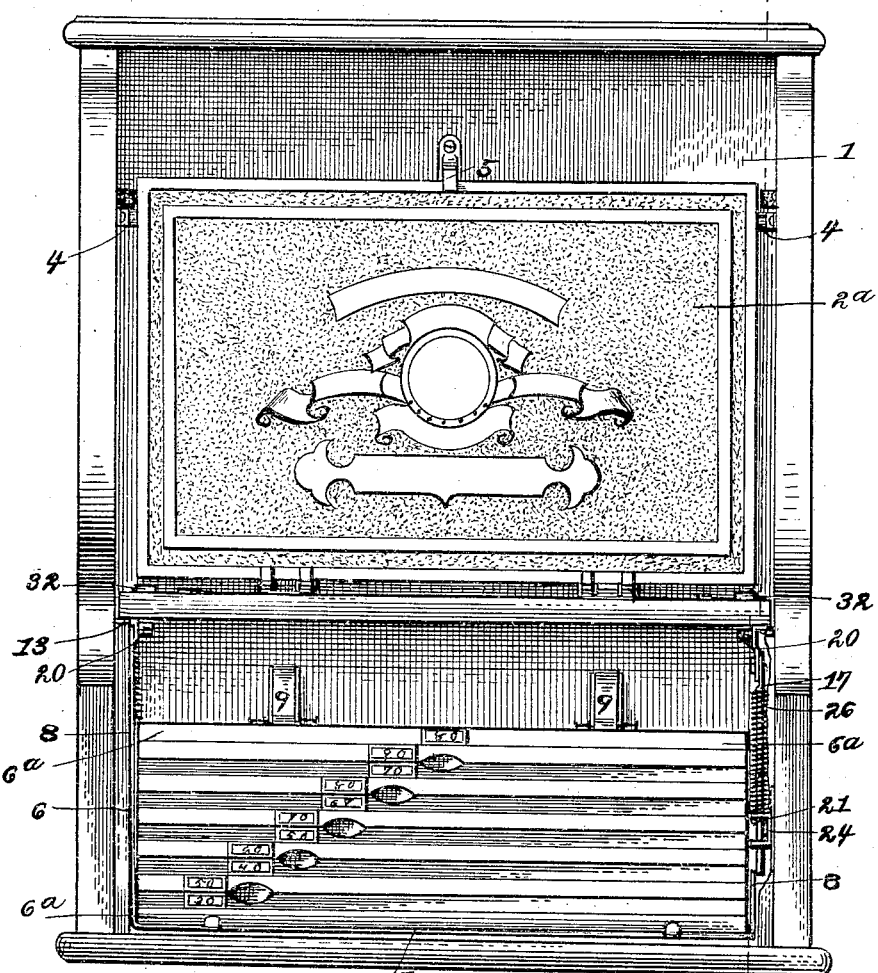

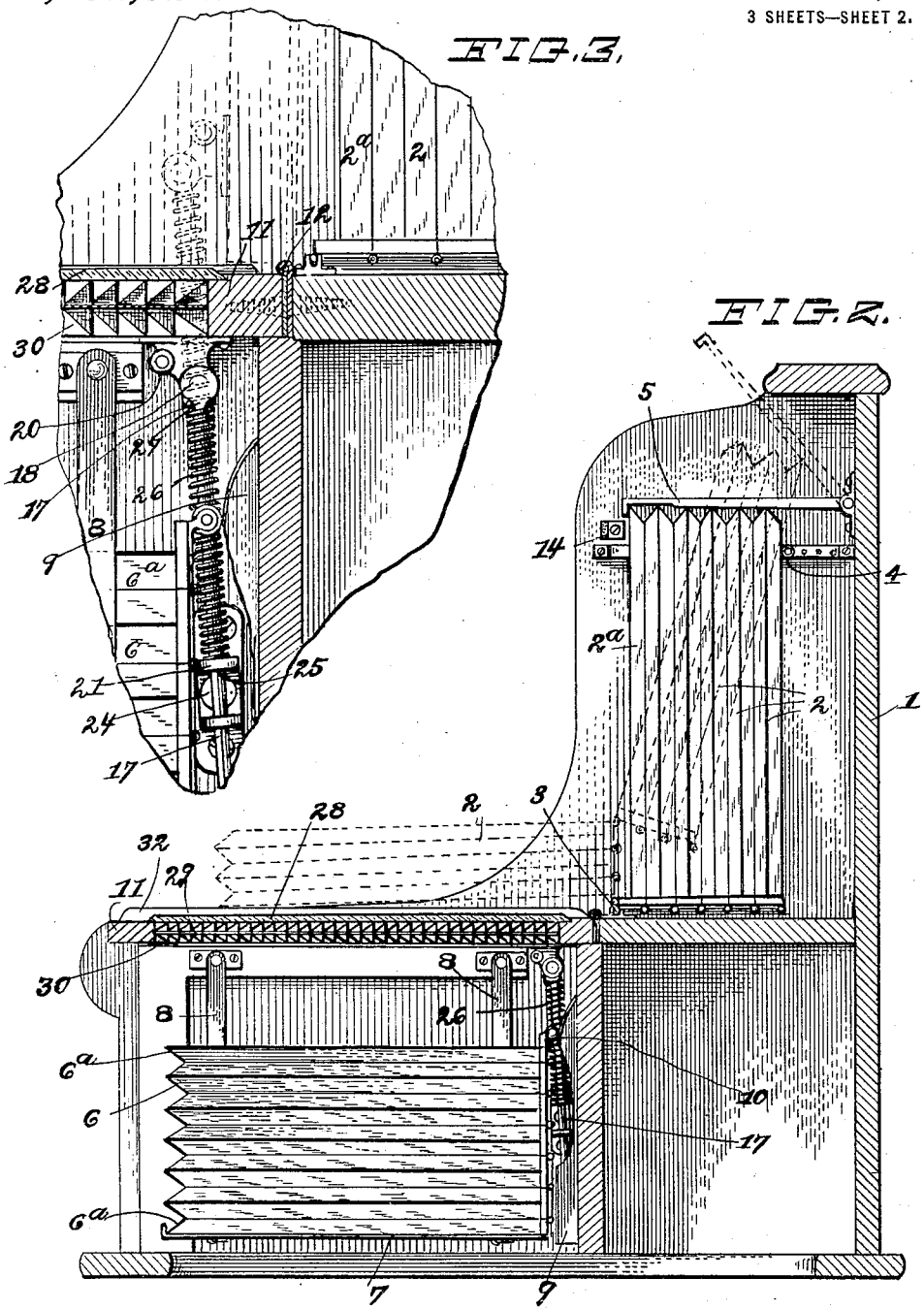

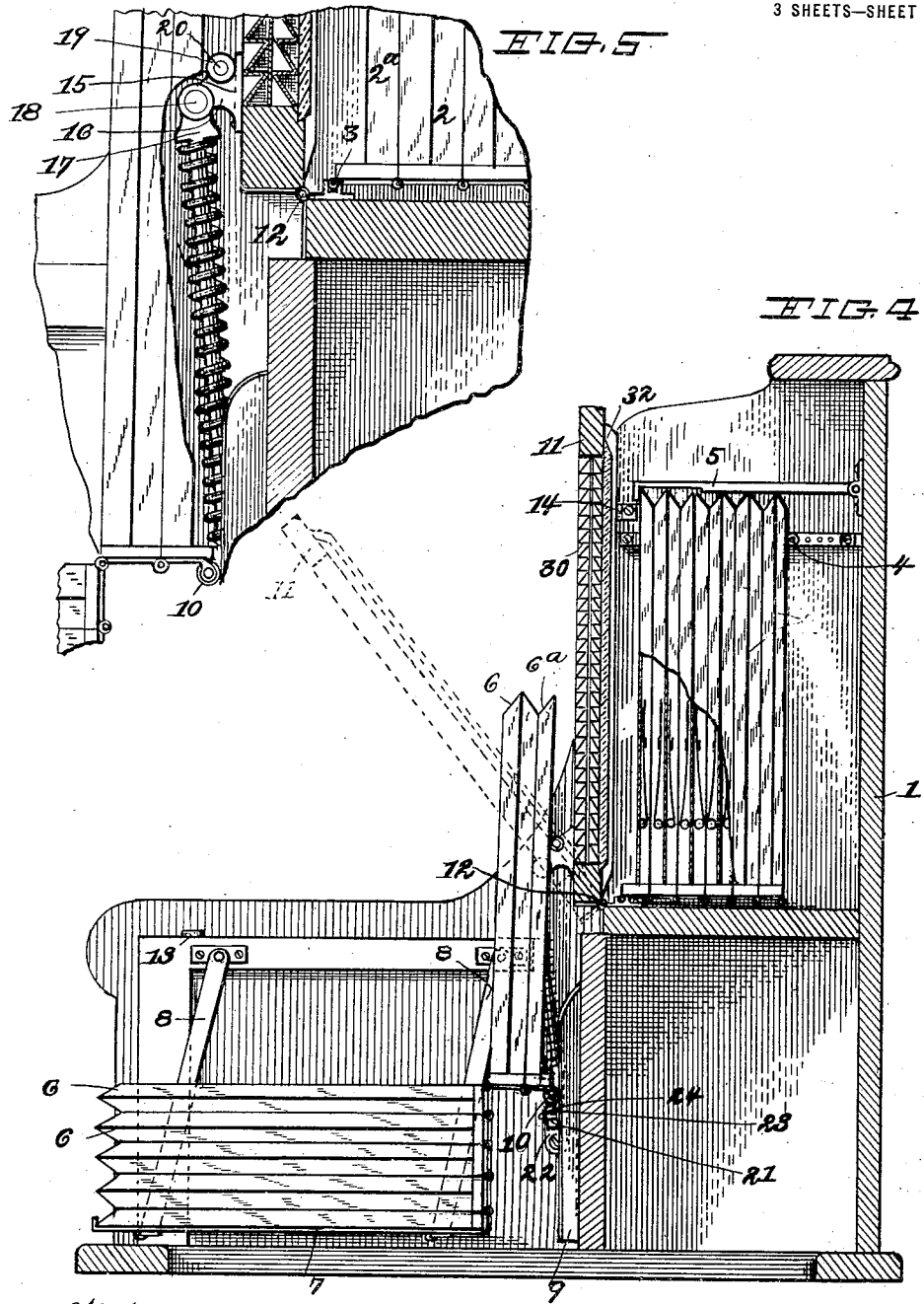

HARRY J. HICK, OF ALLIANCE, OHIO, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,251,521.  Specification of Letters Patent.  Patented Jan. 1, 1918.

Application filed January 7, 1914. Serial No. 810,767.

*To all whom it may concern:*

Be it known that I, HARRY J. HICK, a citizen of the United States, residing at Alliance, in the county of Stark and State of Ohio, have invented certain new and useful Improvements in Filing Appliances, of which the following is a specification.

The invention relates to an appliance for filing, holding and keeping papers or documents in serial or classified arrangement, and particularly to that class of such appliances which includes a series of normally upright hinged holders and a series of normally reclined hinged holders, operatively arranged in juxtaposition to each other, with an intervening index frame or member which may form a writing table and which may also be swung to serve as a support for the holders of the respective series when the same are swung from normal position.

The objects of the improvements are to provide means for controlling the index member by holding it in one operative position and nearly counterbalancing it in the other operative position; for coördinating the index devices to the respective series of holders; and for supporting the respective series of holders, when operated, without contacting or interfering with the index devices.

The purposes of the improvements, thus briefly set forth, are attained by the mechanism, construction and arrangement illustrated with reference to a preferred embodiment in the accompanying drawings forming part hereof, in which—

Figure 1 is a front elevation of the improved filing appliance with the holders and index member in normal position;

Fig. 2, a side-elevation section of same on line 2—2, Fig. 1;

Fig. 3, a fragmentary section showing details of the parts as shown in Fig. 2;

Fig. 4, a section similar to Fig. 2, showing the index member and some of the normally reclined holders in upright position;

Fig. 5, a fragmentary section showing details as in Fig. 4;

Fig. 6, a detached perspective view of the pivot bracket for the controlling bar showing the roller abutment for the normally reclined holders; and Fig. 7, a detached perspective view of the guide bracket for the controlling bar.

Similar numerals refer to similar parts throughout the drawings.

The filing appliance includes the usual casing 1, in which the normally upright series of hinged holders 2 and $2^a$ is operatively supported as by the pivot bearings 3 at the lower end of the foremost holder, and the adjustable abutment rollers 4 at the rear of the rearmost leaf, with the combined lock and guide bar 5; and in which the normally reclined series of holders 6 and $6^a$ may be operatively supported by means of the swinging base 7 on the lower ends of the pendant links 8, and the guide ways 9 for the abutment rollers 10 on the rear end of the upper holder $6^a$; the normally reclined series of holders being located below and in front of the normally upright series of holders, all as shown in the drawings.

The index member 11 is preferably hinged to the casing at 12 immediately in front of the pivot bearings 3 for the upright series of holders, and normally rests in reclined position on the abutments 13 provided in each side of the casing for that purpose, and is stopped in its upright position by the abutments 14 provided in each side of the casing for that purpose; which abutments are preferably faced with rubber or some other elastic material for quieting the impact and cushioning the contact of the index member therewith.

The index frame is also provided with the pivot brackets 15, one of which is formed or secured on its underside at each lateral edge and adjacent to the rear or hinged edge thereon; and each bracket is provided with the pendant ear 16, to which is hinged the upper end of the controlling bar 17 as by the pivot bolt or rivet 18; and each bracket is also provided with an abutment roller 19 mounted on the pivot 20 on the inner side of the bracket which protrudes from the presented face of the index-table in the path of the corresponding edge portion of the upper holder $6^a$ of the normally reclined series, when the table and said holder are swung into upright position.

The guide bracket 21 is composed of the plate 22 to which is swiveled the yoke of the clevis 23 as by the rivet 24, in the arms of which clevis are provided the apertures 25, in which the pendant end of the controlling bar 17 is adapted to operate and be guided. The controlling spring 26 is preferably in the form of the coiled compression spring shown in the drawings, and is located around the guide bar between the upper arm of the guide clevis 23 and the abutment shoulders 27 provided at the upper pivoted end of the guide bar 17.

The parts are so arranged that when the index member is in upright position, as shown in Figs. 4 and 5, the controlling springs are compressed to such an extent that the index member will be held or maintained in upright position; and that when the index member is swung downward into the normal reclined position, as shown in Figs. 1, 2 and 3, the springs will be compressed to a greater extent so that the energy thereof will tend to sustain the added weight of the free end of the index member, but not to such an extent as to raise it from the cushioned abutments provided for the same in its reclined position.

By this construction and arrangement it is evident that at a certain point, practically about two-thirds of the way upward from the normally reclined to the upright position of the index member, the weight of the same is substantially counterbalanced by the energy of the controlling spring; which may be called the neutral position of the index frame, and is indicated in Fig. 4 of the drawing by broken lines. It is furthermore evident that as the index member is swung upward from its neutral position, the weight of the same will be carried to such a greater extent by its hinged end that the energy of the controlling springs will carry the member upward and tend to hold it in upright position, as shown by full lines in Figs. 4 and 5.

On the other hand, when the index member is swung downward from its neutral position and the weight is carried less and less by its hinged end, it will gradually overcome the increased resistance caused by the further compression of the controlling springs, to such an extent that when swung into the normal reclined position it will not be lifted therefrom by the action of the springs. These springs, however, will so resist the downward swinging of the index member as to prevent a severe concussion of the same when impinging the supporting abutments 13, and thereby prevents a disarrangement or a breaking of the index devices and other appurtenances carried thereon, as for instance the glass plate 28 which is preferably provided on the normal upright side of the index plate to form a writing table upon the same.

The index member is provided with a series of index facets 29 in its normally upper side, which facets are inclined upward and rearward so as to be readily visible from a position in front of and slightly above the index member when the same is reclined, as shown in Figs. 1, 2 and 3; and it is also provided with the series of index facets 30 in its normally lower side, which are reversely inclined so as to be readily seen from a similar position in front of the filing appliance.

It will be understood that the first or upper series of index facets are intended to be used in connection with the normally upright series of holders, and that the second or lower series of facets are intended to be used in connection with the normally reclined series of holders; and it will be understood that the respective holders are provided with a series of spring clips 31, as shown in Fig. 4, or other suitable devices for holding papers thereon in the manner well known in filing appliance art.

The glass plate 28 being placed over the series of index facets 29 does not interfere with a ready view of the same, and the abutment strips 32 are preferably provided along the upper side near each lateral edge of the index member in the path of the lateral edge portions of the foremost holder 2ª of the normally upright series, which strips, are placed above or over the glass plate 28, and serve to receive and support the normally upright holders when swung downward in reclined position, as shown in Fig. 2, without permitting the same to contact or interfere with the glass plate 28 on the index devices 29. And it is evident that when the normally reclined holders are swung into upright position, the lateral edge portions of the upper holder 6ª will be stopped and be guided by the abutment rollers 19 on the inner side of the hinge brackets 15, thereby preventing this holder from contacting or interfering with the index devices 30 in the normally lower side of the index member.

I claim:

1. A filing appliance including a casing having two sets of holders mounted therein, and a spring controlled index member hinged to the casing and having two sets of index facets, said member being movable into either one of two selected positions for the coördination of the index facets to the sets of holders and adapted to remain in one position until moved into the other position.

2. A filing appliance including a casing having a normally upright set of holders and a normally reclined set of holders mounted therein, an intermediate member hinged to the casing having index devices on its opposite sides for the respective sets of holders, and abutments in the casing adapted to engage the member, without interfering with the index devices, for supporting the holders of either set when operated from their normal positions.

3. A filing appliance including a case having two sets of holders mounted therein and an index member hinged to the casing and having a set of inclined index facets for each set of holders, the facets for the two sets of holders being inclined in opposite directions toward the hinged end of the member for coördination with the sets of holders.

HARRY J. HICK.

Witnesses:
   J. C. TURNER,
   LOUISE M. CORBY.

Copies of this patent may be obtained for five cents each, by addressing the "Commissioner of Patents, Washington, D. C."